(12) United States Patent
McGrath

(10) Patent No.: US 11,852,287 B2
(45) Date of Patent: Dec. 26, 2023

(54) BRACKET ASSEMBLY

(71) Applicant: Andrew Hascall McGrath, Lafayette, CA (US)

(72) Inventor: Andrew Hascall McGrath, Lafayette, CA (US)

(73) Assignee: Advanced Design MFG LLC, Antioch, CA (US)

( * ) Notice: Subject to any disclaimer, the term of this patent is extended or adjusted under 35 U.S.C. 154(b) by 123 days.

(21) Appl. No.: 17/521,297

(22) Filed: Nov. 8, 2021

(65) Prior Publication Data

US 2023/0144634 A1 May 11, 2023

(51) Int. Cl.

| *F16M 13/02* | (2006.01) |
|---|---|
| *F16M 11/24* | (2006.01) |
| *A47F 10/06* | (2006.01) |
| *A47B 96/06* | (2006.01) |
| *F16B 9/00* | (2006.01) |
| *F16M 11/10* | (2006.01) |
| *A47B 96/14* | (2006.01) |
| *F16M 11/20* | (2006.01) |

(52) U.S. Cl.
CPC .......... *F16M 13/022* (2013.01); *F16M 11/24* (2013.01); *A47B 96/06* (2013.01); *A47B 96/14* (2013.01); *A47F 2010/065* (2013.01); *F16B 9/00* (2013.01); *F16M 11/10* (2013.01); *F16M 11/2014* (2013.01)

(58) Field of Classification Search
CPC ...... F16M 13/022; F16M 11/24; F16M 11/10; F16M 11/2014; F16M 2200/025; F16M 2200/022; F16M 2200/027; A47B 96/06; A47B 96/14; A47F 10/00; A47F 2010/065; F16B 9/00
See application file for complete search history.

(56) References Cited

U.S. PATENT DOCUMENTS

| 8,196,872 B1* | 6/2012 | McGrath | F16B 9/054 |
| | | | 248/65 |
| 8,302,919 B1* | 11/2012 | McGrath | F16M 11/24 |
| | | | 248/398 |
| 8,973,876 B1* | 3/2015 | McGrath | F16M 11/2014 |
| | | | 248/398 |
| 9,962,439 B2* | 5/2018 | Matsushita | A61P 37/04 |
| 2010/0045149 A1* | 2/2010 | English | A47B 96/062 |
| | | | 312/140.4 |
| 2012/0200207 A1* | 8/2012 | Atkins | A47F 10/06 |
| | | | 312/137 |

(Continued)

*Primary Examiner* — Tan Le
(74) *Attorney, Agent, or Firm* — Quarles & Brady LLP

(57) ABSTRACT

A bracket assembly includes a cylindrical member configured to hold a supporting bar at a first opening of the cylindrical member, a cylindrical core housed in the cylindrical member from the second opening of the cylindrical member, an annular cap coupled with the cylindrical core at the second opening of the cylindrical member, and a torque cartridge housed within a torque cartridge housing and transversely press fitted into the cylindrical member and the cylindrical core. The torque cartridge has a first portion with a first end that is coupled to the cylindrical core and a second portion with a first end that is rotatably coupled at a second end of the first portion to provide an infinite smooth pivoting movement between the first and second portions of the torque cartridge.

20 Claims, 7 Drawing Sheets

(56) References Cited

U.S. PATENT DOCUMENTS

2013/0026312 A1\* 1/2013 Wang ..................... F16M 11/08
                                                            248/125.7
2018/0242760 A1\* 8/2018 Cummings ............. A47F 10/06

\* cited by examiner

BRACKET ASSEMBLY

FIELD OF THE DISCLOSURE

The present invention relates to an assembly for support structures, and more particularly, relates to a bracket assembly for quick and easy coupling of a frame and support structures.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed technology.

Conventional support structures generally include permanent support structures and non-permanent support structures. Permanent support structures are commonly used as decks, sheds, lofted beds, and other structures that may need to be efficiently assembled. On the other hand, non-permanent support structures are commonly used in a wide range of settings, such as wood storage racks, temporary storage crates, stages and runways, and other structures that may need to be efficiently assembled and disassembled. Further, some conventional support structures provide for adjustable height supports and bracketing. Such support structures typically include an upright support member for supporting a platform or a frame and an assembly for securing the upright support member, which is commonly referred to as a bracket assembly.

However, designing and assembling the bracket assembly can be complicated since dimensions, load factors, code requirements, and aesthetics converge to present bracket assemblies that are labor intensive to assembly numerous components thereof. For example, some bracket assemblies have many component parts and require several tools for assembling the bracket assembly. Moreover, conventional bracket assemblies or positional adjustment of an assembled bracket assembly may require more than one person and can be time consuming. Further, some conventional ready-to-assemble bracket assemblies utilize location dependent upright support members that exponentially increase effort needed to design and assemble the bracket components thereof. Still further, such bracket assemblies may need to be supported by adequate and aesthetically pleasing attachment components for securing the assembly to one or more fixed support structures.

As one particular example of the prior art, a wall mounting system includes a fastening member that includes one or more mounting studs and one or more anchor apertures. The fastening member is configured to be anchored to a support structure by one or more fasteners disposed through the one or more anchor apertures. The wall mounting system also includes a bushing assembly having an inner portion and an outer portion. The inner portion further includes a through-hole that is configured to receive a mounting stud. The outer portion is configured to rotate about the inner portion and includes at least one set screw aperture that is configured to align with a set screw aperture of an accessory sleeve to receive a set screw therein. It should be appreciated that rotation of the outer portion about the inner portion enables indexing of the set screw aperture about a longitudinal axis of the bushing assembly. However, the example wall mounting system still does not facilitate rotation of a bracket assembly along a supporting bar thereof.

Given the deficiencies of the prior art described above, there is a need for an effective and improved design of a bracket assembly that is more easily assembled, provides a more easily adjustable height, and can hold multiple frames without perforating the frame.

SUMMARY OF THE INVENTION

According to embodiments disclosed herein, a first bracket assembly for supporting a plurality of frames comprises a cylindrical member configured to receive a supporting bar. The cylindrical member holds a first part of the supporting bar and comprises a first opening and a second opening. The cylindrical member is a hollow cylinder threaded on an inner surface thereof. In one embodiment, the cylindrical member comprises a plurality of axial grooves integrated on an outer surface of the cylindrical member to provide appropriate gripping. In an embodiment, the supporting bar comprises an assembly for adjustable height and an internal threaded fastener member. The first bracket assembly further comprises a cylindrical core housed in the cylindrical member from the second opening of the cylindrical member. In one embodiment, the cylindrical core is threaded for coupling with the inner surface of the cylindrical member. Further, the cylindrical core comprises a stepped section, a threaded section, a locking element, and a plurality of slotted openings. In one embodiment, the stepped section of the cylindrical core is configured to receive the first part of the supporting bar. In one embodiment, the threaded section of the cylindrical core is coupled with the inner surface of the cylindrical member. Further, the locking element of the cylindrical core is configured to lock the second opening of the cylindrical member.

In one embodiment, the plurality of slotted openings is integrated along a longitudinal axis of the cylindrical core. Further, the plurality of slotted openings is configured to receive the plurality of threaded fasteners. The first bracket assembly further comprises an annular cap that is press fitted at the second opening of the cylindrical member for providing support to the cylindrical member and the supporting bar is coupled to the first bracket assembly via the annular cap. Further, the annular cap is configured to close a cylindrical member housing of the cylindrical core from the second opening of the cylindrical member. The first bracket assembly further comprises a torque cartridge housing transversely fitted into the cylindrical member and the cylindrical core. The torque cartridge housing is a hollow cylindrical section press fitted at one end to the annular cap and comprises a torque cartridge housed with the hollow cylindrical section of the torque cartridge housing. The torque cartridge comprises a first portion with a first end which is coupled to the cylindrical core and a second portion with a first end which is rotatably coupled at a second end of the first portion. The first bracket assembly further comprises a clamping element coupled to a second end of the second portion for holding the plurality of frames. The torque cartridge provides an infinite smooth pivoting movement between the first portion and the second portion of the torque cartridge. Thus, such a bracket assembly provides a solution to adjust height of the supporting bar for holding a plurality of frames having infinite pivoting movement around the supporting bar.

In one embodiment, the first portion of the torque cartridge comprises a cylindrical housing and the second portion comprises a shaft. Further, the torque cartridge housing corresponds as a hollow guide for receiving the shaft of the first portion and the second portion by performing a rotation. In one embodiment, the first bracket assembly further comprises a plate coupled between the first and second portions of the torque cartridge to provide smooth rotary movement. In another embodiment, the first bracket assembly further comprises a plurality of threaded fasteners to couple the cylindrical member, the cylindrical core, and the annular cap.

In another embodiment, a second bracket assembly is connected to a second part of the supporting bar in an opposite direction relative to the first bracket assembly, which is connected to the first part of the supporting bar. The first part of the supporting bar is an upper part and the second part of the supporting bar is a lower part. In one embodiment, a cylindrical member of the second bracket assembly receiving the second part of the supporting bar is configured to be movable along a length of the supporting bar. In another embodiment, the cylindrical member receiving the second part of the supporting bar is configured to be moveable along the length of the supporting bar towards or away from the cylindrical member receiving the first part of the supporting bar. In one embodiment, the supporting bar may facilitate movement of the second bracket assembly towards or away from the first bracket assembly.

Other features and aspects of this disclosure will be apparent from the following description and the accompanying drawings.

BRIEF DESCRIPTION OF THE DRAWINGS

The accompanying drawings illustrate various embodiments of systems, methods, and various other aspects of the disclosure. Any person with ordinary skill in the art will appreciate that the illustrated element boundaries (e.g. boxes, groups of boxes, or other shapes) in the drawings represent one example of the boundaries. It may be that in some examples one element may be designed as multiple elements or that multiple elements may be designed as one element. In some examples, an element shown as an internal component of one element may be implemented as an external component in another, and vice versa. Furthermore, elements may not be drawn to scale. Nonlimiting and non-exhaustive descriptions are described with reference to the following drawings. The components in the drawings are not necessarily to scale, with emphasis instead being placed upon illustrating principles.

DETAILED DESCRIPTION

Some embodiments of this disclosure will now be discussed in detail. The words "comprising," "having," "containing," "including," and other forms thereof are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present disclosure, the preferred systems and methods are now described.

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

Figure 1A:
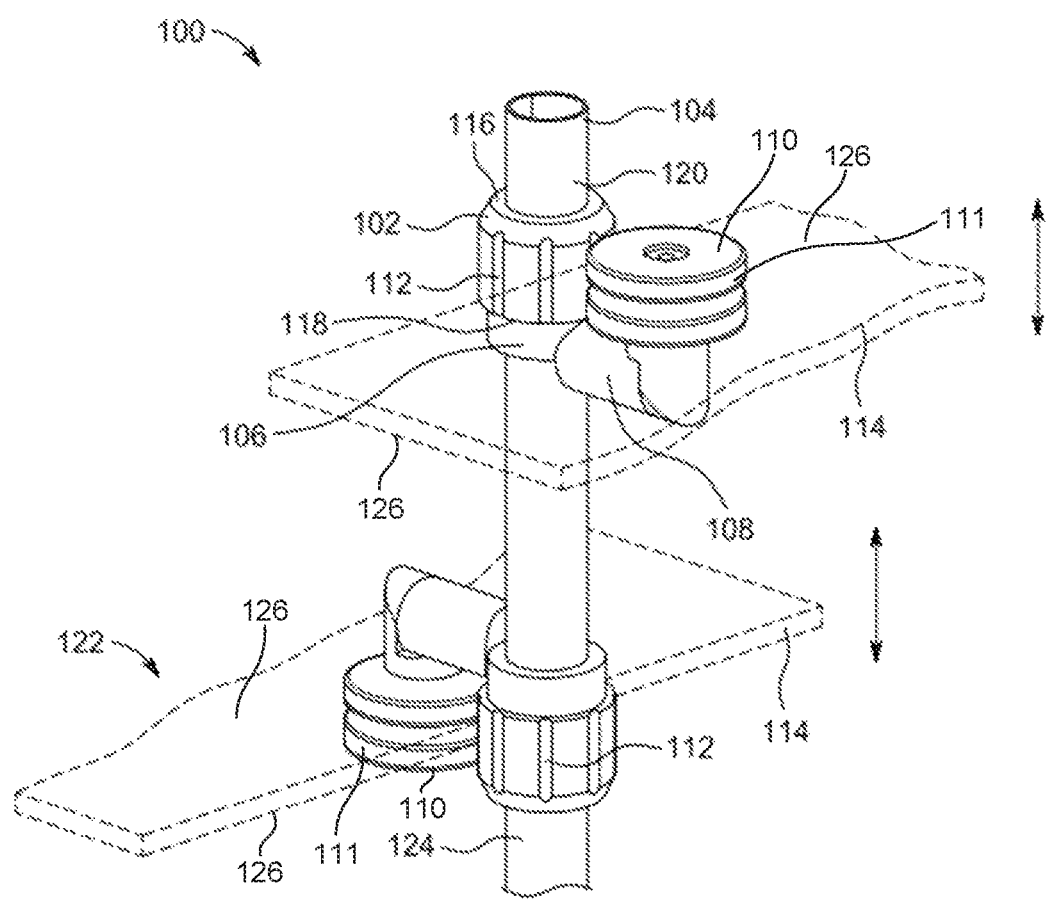
FIG. 1A is a perspective view of a bracket assembly in a first arrangement, according to an embodiment of the present disclosure.

FIG. 1A illustrates a perspective view of a bracket assembly for holding a plurality of frames in multiple positions with an adjustable height, according to an embodiment. FIG. 1A is described in conjunction with FIGS. 1B-5A.

A first bracket assembly 100 may be provided for holding a plurality of frames in multiple positions without requiring penetration of corners of the frames. The first bracket assembly 100 may comprise a cylindrical member 102, a supporting bar 104, an annular cap 106, a torque cartridge housing 108, a clamping element 110, a plurality of axial grooves 112, and a plurality of frames 114. The cylindrical member 102 may comprise a first opening 116 and a second opening 118 with a cylindrical member axis 117 extending through the first and second openings 116, 118. In one embodiment, the first opening 116 of the cylindrical member 102 may be configured to receive a first part 120 of the supporting bar 104. In one embodiment, the first part 120 of the supporting bar 104 may be referred to as an upper side. In some implementations, the supporting bar 104 may be a hollow cylindrical column or a hollow cylindrical pipe. The cylindrical member 102 may be provided with the plurality of axial grooves 112 that may be integrally formed along an outer surface of the cylindrical member 102 and along a length of the cylindrical member 102. Further, the second opening 118 of the cylindrical member 102 may be covered with the annular cap 106. In one embodiment, an inner surface of the cylindrical member 102 may be threaded. In another embodiment, the annular cap 106 may be press fitted with the cylindrical member 102.

Figure 3:
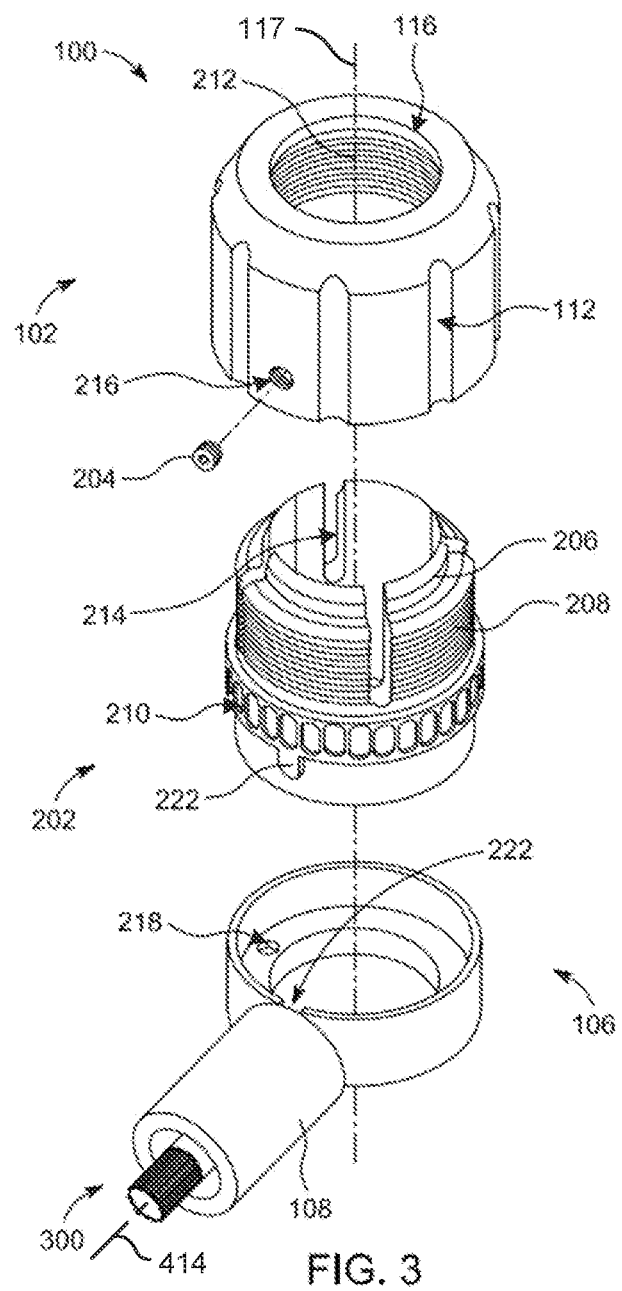
FIG. 3 is an exploded view of the bracket assembly of FIG. 1 coupled with a torque cartridge.

The torque cartridge housing 108 may be configured to be press fitted with the annular cap 106. In one embodiment, the torque cartridge housing 108 may be transversely press fitted at the annular cap 106 at one end. In one embodiment, the clamping element 110 may be configured to grip one or more of the plurality of frames 114, such as, e.g., via a clamping member 111 configured to engage opposing planar surfaces 126 (see FIG. 1A) of one or more frames of the plurality of frames 114. As shown in FIG. 3, the torque cartridge housing 108 may be a hollow section for housing a torque cartridge 300 therein. The clamping element 110 may be configured to have rotational movement provided by the torque cartridge 300. In one embodiment, the plurality of frames 114 within the clamping element 110 may be adjusted at different angles by rotating the torque cartridge 300.

Figure 1B:
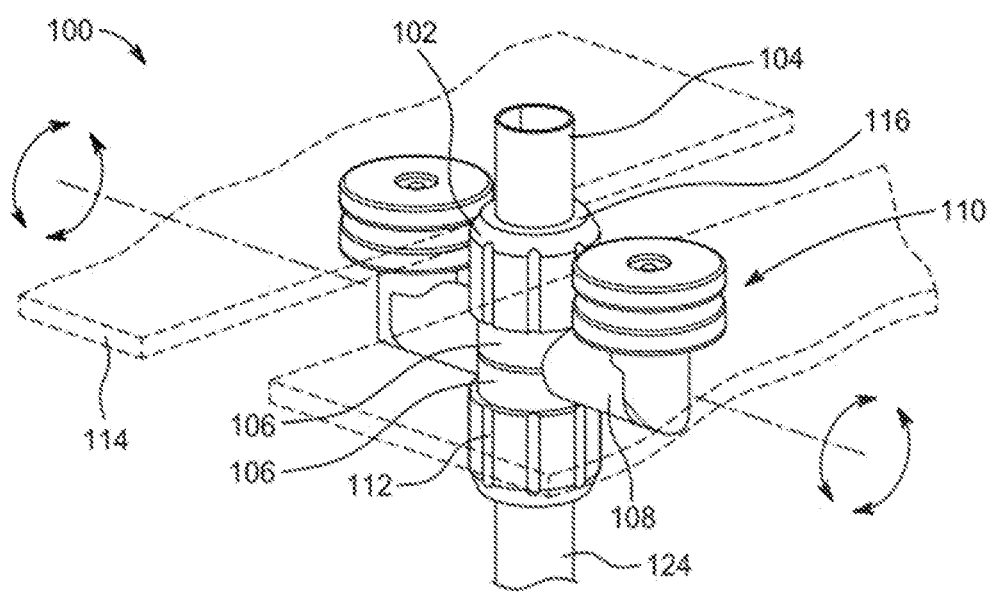
FIG. 1B is a perspective view of the bracket assembly of FIG. 1 in a second arrangement.

As shown in FIGS. 1A and 1B, a second bracket assembly 122 may be provided that may be similar to the first bracket assembly 100. In particular, the second bracket assembly 122 may be configured to receive a second part 124 of the supporting bar 104. The second bracket assembly 122 may comprise a cylindrical member, a cylindrical core, an annular cap, a torque cartridge housing, and a torque cartridge that may be arranged in a similar fashion as described with respect to the first bracket assembly 100. In one embodiment, a plurality of cylindrical members of a plurality of bracket assemblies may be coupled with the supporting bar 104 in different arrangements. In one embodiment, a first arrangement may be shown in FIG. 1A, with the first bracket assembly 100 receiving the first part 120 of the supporting bar 104 and the second bracket assembly 122 receiving the second part 124 of the supporting bar 104. Further, as shown in FIG. 1A, the cylindrical member 102 of the first bracket assembly 100 may be configured to hold one frame of the plurality of frames 114 with the clamping element 110 adjusted towards the first opening 116 of the cylindrical member 102 by the torque cartridge 300, and the second bracket assembly 122 may be configured to hold another frame of the plurality of frames 114 towards the second opening 118 of the cylindrical member 102 by the torque cartridge of the second bracket assembly 122, at some distance from the cylindrical member 102, and along a length of the supporting bar 104.

A second arrangement of the cylindrical members 102 of the first and second bracket assemblies 100, 122 holding the plurality of frames 114 is shown in FIG. 1B. As shown in FIG. 1B, the first bracket assembly 100 may receive the first part 120 of the supporting bar 104 and the second bracket assembly 122 may receive the second part 124 of the supporting bar 104. Further, the torque cartridge 300 of the cylindrical member 102 may be rotated to hold one frame of the plurality of frames 114 towards the first opening 116 of the cylindrical member 102 while the torque cartridge of the second bracket assembly 122 may be rotated to hold another frame of the plurality of frames 114 towards the first opening 116 of the cylindrical member 102. In one embodiment, the torque cartridge may provide a smooth pivoting movement to rotate the clamping element 110 between the first and second openings 116, 118 of the cylindrical member 102. In one exemplary embodiment, the first and second bracket assemblies 100, 122 may be collectively referred to as a bracketing assembly. In one embodiment, the cylindrical member of the second bracket assembly 122 that receives the second part 124 of the supporting bar 104 may be moveable along the length of the supporting bar 104. In another embodiment, the cylindrical member of the second bracket assembly 122 may be moveable only towards the cylindrical member 102 of the first bracket assembly 100 receiving the first part 120 of the supporting bar 104. In another embodiment, the cylindrical member of the second bracket assembly 122 may be moveable only away from the cylindrical member 102 of the first bracket assembly 100 receiving the first part 120 of the supporting bar 104. Therefore, the supporting bar 104 may facilitate movement of the second bracket assembly 122 along its length towards or away from the first bracket assembly 100. In one embodiment, the first and second bracket assemblies 100, 122 may be arranged along the supporting bar 104 as shown in FIGS. 1A and 1B.

Figure 2:
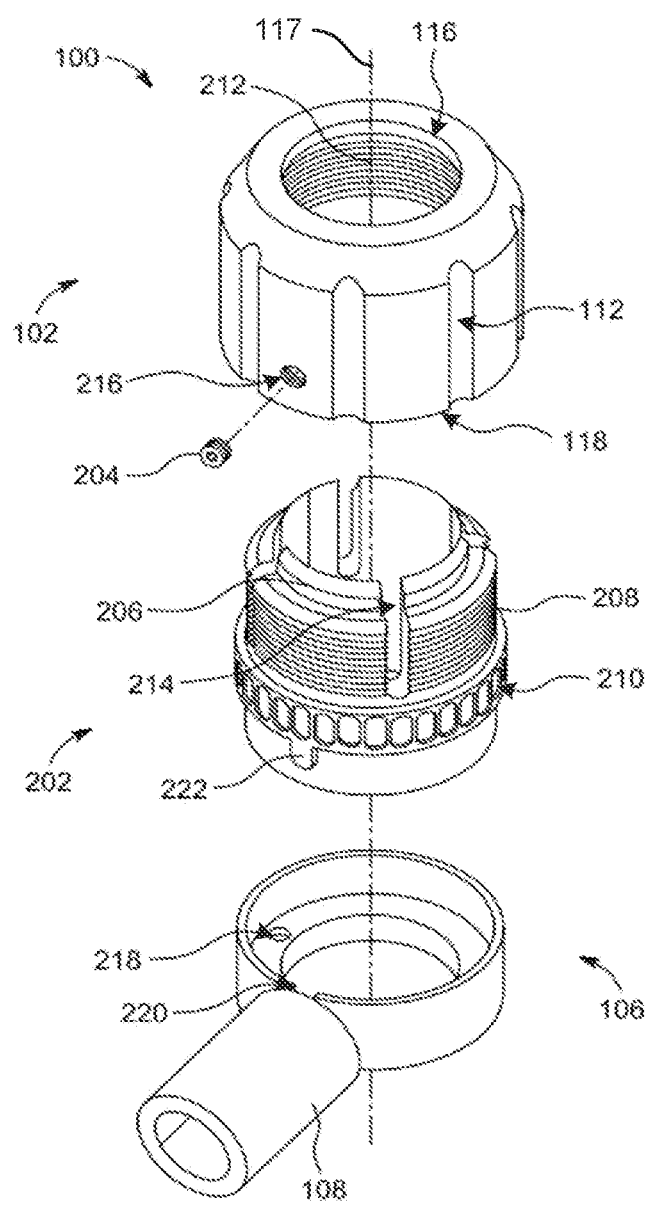
FIG. 2 is an exploded view of the bracket assembly of FIG. 1.

Referring now to FIG. 2, an exploded view of the first bracket assembly 100 is illustrated. FIG. 2 is described in conjunction with FIGS. 1A, 1B, and 3-5B. As shown in FIG. 2, the first bracket assembly 100 may further comprise a cylindrical core 202 configured to be housed in the cylindrical member 102. In one embodiment, the cylindrical core 202 may be coupled from the second opening 118 of the cylindrical member 102 using a plurality of threaded fasteners 204. The cylindrical core 202 may comprise a stepped section 206, a threaded section 208, and a locking element 210. In one embodiment, the stepped section 206 of the cylindrical core 202 may be configured to receive the first part 120 of the supporting bar 104. In another embodiment, the threaded section 208 of the cylindrical core 202 may be coupled with an inner surface 212 of the cylindrical member 102. In one embodiment, the locking element 210 may be configured to lock the second opening 118 of the cylindrical member 102. In another embodiment, the locking element 210 may be a ring of small elements integrated around a circumference of the cylindrical core 202.

The cylindrical core 202 may comprise a plurality of slotted openings 214 integrated along a longitudinal axis of the cylindrical core 202. In one embodiment, the plurality of slotted openings 214 of the cylindrical core 202 may be configured to receive the plurality of threaded fasteners 204, when the threaded section 208 is coupled with the inner surface 212 of the cylindrical member 102. In one embodiment, the plurality of threaded fasteners 204 may be coupled to the plurality of open slotted elements 214 via a plurality of threaded holes 216. In such embodiments, the plurality of threaded holes 216 may be integrated over the cylindrical member 102 near the second opening 118 of the cylindrical member 102.

In one embodiment, the plurality of threaded fasteners 204 may comprise a spiraling ramp (not shown). In such embodiments, the spiraling ramp may be a simple mechanism for converting rotational motion into linear motion. In one exemplary embodiment, the spiraling ramp may convert a torque (i.e., rotational force) into a linear force. In one embodiment, the spiraling ramp may be referred to as threads. In such embodiments, the threads on an inner side the cylindrical member 102 may be referred to as an internal or female threads, and the threads on an outer side of the cylindrical core 202 are referred to as external or male threads. In such embodiments, an interaction of the internal threads of the cylindrical member 102 with the external threads of the cylindrical core 202 may convert the rotational movement to linear movement.

The annular cap 106 may be press fitted into the second opening 118 of the cylindrical member 102 for providing support to the cylindrical member 102. In one exemplary embodiment, the annular cap 106 may be coupled to the cylindrical core 202 using a plurality of screws (not shown). For example, the annular cap 106 may comprise a plurality of holes 218 integrated at a bottom of the annular cap 106 that may be configured to receive the plurality of screws to couple the annular cap 106 with the cylindrical core 202 and therefore to the cylindrical member 102. Further, the annular cap 106 may be provided with a grooved section 220 integrated on a circumference of the annular cap 106 that may be configured to receive an extruded section 222 integrated on the locking element 210 of the cylindrical core 202. In one embodiment, the extruded section 222 of the cylindrical core 202 may be configured to couple with the grooved section 220. In one exemplary embodiment, the cylindrical member 102, the cylindrical core 202, and the annular cap 106 are separate, unitary pieces comprising materials selected from the group consisting of: aluminum, steel, high strength carbon materials, carbon fiber, and carbon fiber-reinforced polymers. It can be noted that the supporting bar 104 may be coupled to the first bracket assembly 100 via the annular cap 106.

Referring now to FIG. 3, another perspective view of the bracket assembly coupled with the torque cartridge 300 is illustrated. FIG. 3 is described in conjunction with FIGS. 1A-2 and 4-5B. The torque cartridge housing 108 may be configured to be press fit with the annular cap 106. In an embodiment, the torque cartridge 300 housed within the torque cartridge housing 108 may be transversely fitted into the cylindrical member 102 and the cylindrical core 202.

Figure 4:
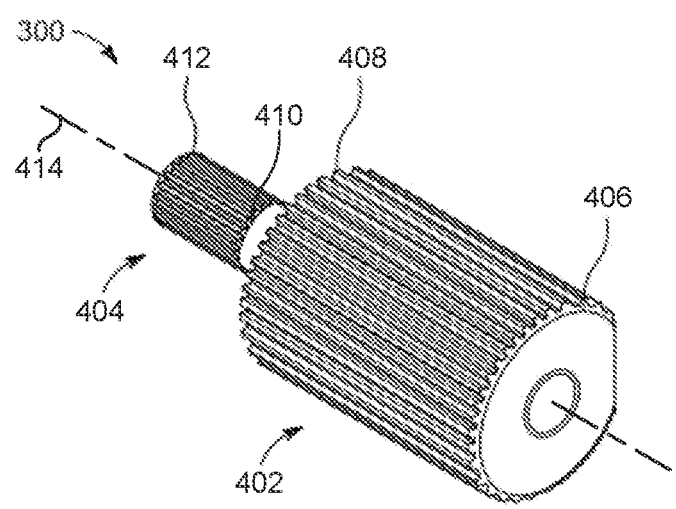
FIG. 4 is a perspective view of the torque cartridge of FIG. 3.

FIG. 4 illustrates a perspective view of the torque cartridge 300, and is described in conjunction with FIGS. 1A-3. In the illustrated embodiment, the torque cartridge 300 includes a first portion 402 and a second portion 404 that are coupled to each other and may provide an infinite smooth pivoting movement between the first and second portions 402, 404. In another embodiment, the infinite smooth pivoting movement of the torque cartridge 300 may be configured to provide a smooth rotary movement between the first and second portions 402, 404 of the torque cartridge 300. In one embodiment, the first portion 402 may be referred to as a cylindrical housing, and the second portion 404 may be referred to as a shaft. Further, the first portion 402 may comprise a first end 406 and a second end 408 and the second portion 404 may comprise a first end 410 and a second end 412, and a torque cartridge axis 414 extends through the first end 406 of the first portion 402 and the second end 412 of the second portion 404. In one embodiment, the first end 406 of the first portion 402 may be coupled with the cylindrical core 202 of the first bracket assembly 100.

Figure 5A:
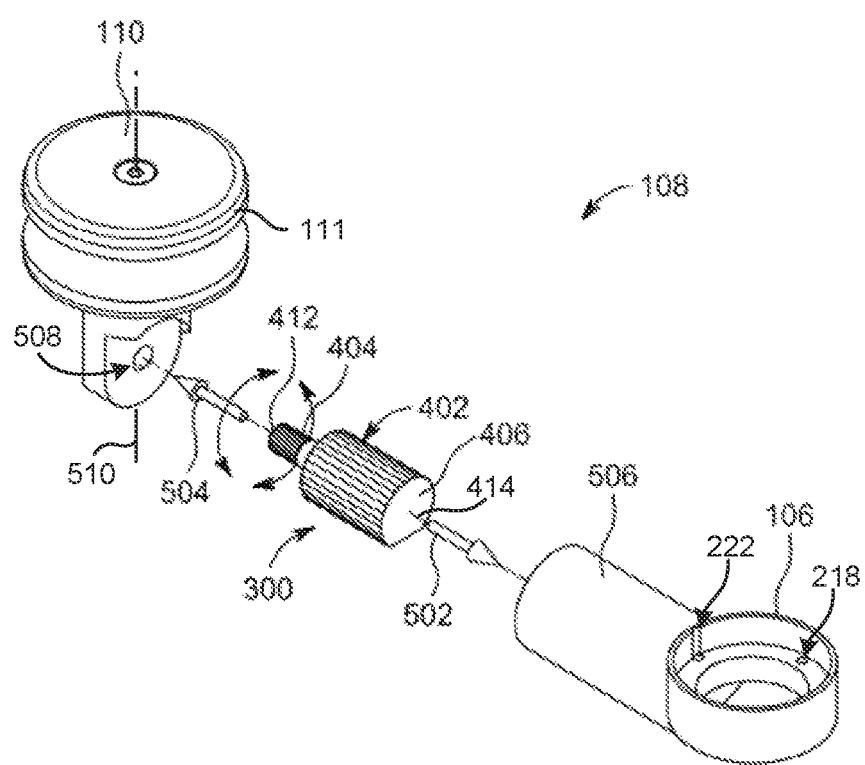
FIGS. 5A and 5B are exploded views of a torque cartridge housing and an annular cap of the bracket assembly of FIG. 1.
Figure 5B:
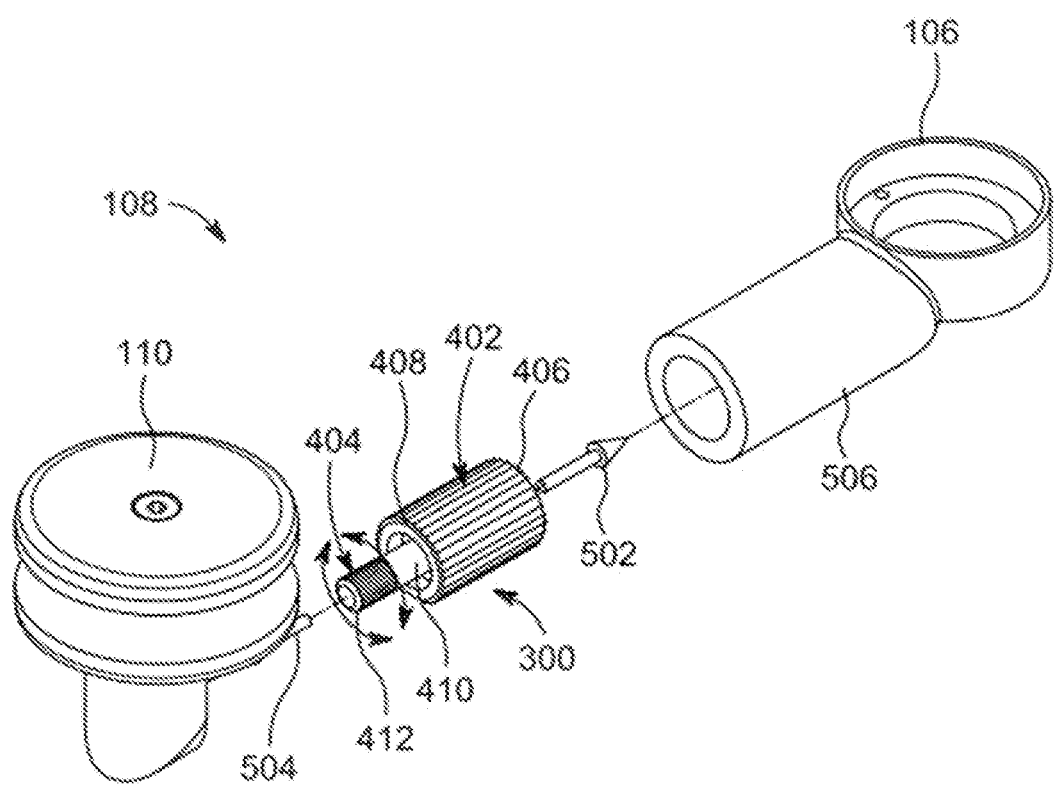

FIG. 5A and FIG. 5B illustrate exploded views of the torque cartridge housing 108 coupled with the clamping element 110, and are described in conjunction with FIGS. 1-4. The torque cartridge housing 108 may be coupled transversely with the annular cap 106, the cylindrical core 202, and the cylindrical member 102. In one embodiment, the torque cartridge housing 108 may be referred to as an orbit arm or simply an aim for holding the plurality of frames 114. In one embodiment, the torque cartridge housing 108 may be configured to receive the first end 406 of the first portion 402 of the torque cartridge 300, as shown by arrow 502. Further, the second end 412 of the second portion 404 of the torque cartridge 300 may be coupled with the clamping element 110, as shown by arrow 504. In addition, the clamping element 110 may be provided with an aperture 508 to receive the second end 412 of the second portion 404 of the torque cartridge 300. In the illustrated embodiment, the aperture 508 is disposed toward one end of the clamping element 110 opposite another end with the clamping member 111, and a clamping member axis 510 extends through the ends of the clamping element 110.

In one embodiment, the torque cartridge housing 108 may be a hollow cylindrical section 506 transversely press fit at one end with the annular cap 106 and open at another end to receive the torque cartridge 300. In another embodiment, the torque cartridge housing 108 may be coupled to the annular cap 106 using a press fit technique. Further, the torque cartridge 300 may provide a smooth pivoting or rotating movement due to the plate coupled between the second end 408 of the first portion 402 of the torque cartridge 300 and the first end 410 of the second portion 404 of the torque cartridge 300. In one embodiment, the clamping element 110 may be detachably attached to the torque cartridge 300. The clamping element 110 may be configured to hold the plurality of frames 114 which can be detached from the first bracket assembly 100 by loosening the clamping element 110. Thus, such a bracket assembly with the torque cartridge 300 facilitates a smooth pivoting movement of the plurality of frames 114.

The features of the present disclosure will be apparent with reference to the foregoing description and attached drawings. In the description and drawings, particular embodiments of the invention have been disclosed in detail as being indicative of some of the ways in which the principles of the disclosed technology may be employed, but it is understood that the present disclosure is not limited correspondingly in scope. Features that are described and/or illustrated with respect to one embodiment may be used in the same way or in a similar way in one or more other embodiments and/or in combination with or instead of the features of the other embodiments.

While the preferred embodiment of the disclosed technology has been illustrated and described, as noted above, many changes can be made without departing from the spirit and scope of the present disclosure. For example, aspects of the present disclosure may be adopted on alternative operating systems. Accordingly, the scope of the present disclosure is not limited by the disclosure of the preferred embodiment. Instead, the scope of the present disclosure should be determined entirely by reference to the claims that follow.

What is claimed is:

1. A bracket assembly to adjustably hold a frame relative to a supporting bar, the bracket assembly comprising:
    a cylindrical member having a first opening extending axially through the cylindrical member to a second opening of the cylindrical member, the cylindrical member configured to receive the supporting bar within the first and second openings;
    a cylindrical core received within the second opening of the cylindrical member;
    an annular cap coupled with the cylindrical core at the second opening of the cylindrical member and configured to engage the cylindrical core housed in the cylindrical member;
    a torque cartridge housing extending outwardly from the annular cap;
    a torque cartridge including a cylindrical housing and a shaft, at least the cylindrical housing being housed within the torque cartridge housing; and
    a clamping element rotatably coupled to the torque cartridge housing and configured to releasably hold the frame,
    wherein a first end of the cylindrical housing of the torque cartridge is fixedly coupled to the torque cartridge housing and a first end of the shaft of the torque cartridge is rotatably coupled at a second end of the cylindrical housing such that the shaft is rotatable relative to the cylindrical housing and to the torque cartridge housing, and
    wherein a second end of the shaft of the torque cartridge is fixedly coupled to the clamping element such that the clamping element is rotatable relative to the annular cap and to the supporting bar while the cylindrical housing of the torque cartridge remains stationary relative to the annular cap and to the supporting bar.

2. The first bracket assembly of claim 1, wherein the first end of the cylindrical housing of the torque cartridge is disposed between the supporting bar and the second end of the shaft of the torque cartridge.

3. The bracket assembly of claim 1, wherein the clamping element includes an aperture, and
    wherein the second end of the shaft of the torque cartridge is press fit into the aperture of the clamping element.

4. The bracket assembly of claim 3, wherein the cylindrical housing of the torque cartridge is press fit into the torque cartridge housing.

5. The bracket assembly of claim 1, wherein the cylindrical core includes a stepped section configured to receive the supporting bar and a threaded section coupled with an inner surface of the cylindrical member.

6. A bracketing assembly comprising:
a supporting bar; and
one or more bracket assemblies configured to operatively engage the supporting bar and to hold one or more frames relative to the supporting bar, the one or more bracket assemblies comprising:
a cylindrical member having a first opening and a second opening, the cylindrical member being configured to receive the supporting bar within at least the second opening of the cylindrical member;
a cylindrical core received within the second opening of the cylindrical member and housed in the cylindrical member;
an annular cap coupled with the cylindrical core, the annular cap including a cylindrical section extending outwardly from the annular cap;
a clamping element coupled to an outer end of the cylindrical section of the annular cap, the clamping element having a clamping member that is configured to releasably hold the one or more frames; and
a torque cartridge including a cylindrical housing arranged within the cylindrical section of the annular cap and a shaft rotatably coupled to the cylindrical housing, the shaft of the torque cartridge being coupled with the clamping element such that the clamping element is rotatable relative to the cylindrical section of the annular cap and to the supporting bar while the cylindrical housing of the torque cartridge remains stationary relative to the cylindrical section of the annular cap and to the supporting bar,
wherein the one or more bracket assemblies is configured to be releasably securable at an adjustable position along a length of the supporting bar when the cylindrical member is threadably coupled with the cylindrical core.

7. The bracketing assembly of claim 6, wherein the cylindrical housing of the torque cartridge is disposed between the supporting bar and the shaft of the torque cartridge.

8. The bracketing assembly of claim 6, wherein the one or more bracket assemblies is a first bracket assembly, the cylindrical member is a first cylindrical member that is configured to receive a first part of the supporting bar, and the clamping member is a first clamping member configured to hold a first frame of the one or more frames, and
wherein the bracket assembly further comprises a second bracket assembly with a second cylindrical member that is configured to receive a second part of the supporting bar that is different than the first part of the supporting bar.

9. The bracketing assembly of claim 8, wherein a second clamping member of the second bracket assembly is configured to hold the first frame or a second frame of the one or more frames.

10. The bracketing assembly of claim 8, wherein the second bracket assembly is configured to be releasably securable to the supporting bar at an adjustable position relative to the first bracket assembly.

11. The bracket assembly of claim 1, wherein the torque cartridge housing is rotatably fixed relative to annular cap.

12. The bracket assembly of claim 11, wherein the torque cartridge housing is integrally formed with the annular cap.

13. The bracket assembly of claim 1, wherein a cylindrical member axis extends through the first and second openings of the cylindrical member,
wherein a torque cartridge axis extends through the first end of the cylindrical housing of the torque cartridge and the second end of the shaft of the torque cartridge, the torque cartridge axis being substantially perpendicular to the cylindrical member axis.

14. The bracket assembly of claim 13, wherein the clamping element has a clamping member at a first end of the clamping element and an aperture that is disposed adjacent to a second end of the clamping element that is opposite the first end of the clamping element.

15. The bracket assembly of claim 14, wherein a clamping element axis extends through the first and second ends of the clamping element, and
wherein the clamping element axis is substantially perpendicular to the torque cartridge axis.

16. The bracket assembly of claim 15, wherein the clamping member of the clamping element is configured to releasably hold the frame with the clamping element axis being substantially perpendicular to a planar surface of the frame.

17. A bracket assembly to adjustably hold a frame relative to a supporting bar, the bracket assembly comprising:
a cylindrical member having a first opening and a second opening, the cylindrical member being configured to receive the supporting bar within at least the second opening;
a cylindrical core received within the second opening of the cylindrical member and housed in the cylindrical member;
an annular cap coupled to the cylindrical core, the annular cap including a cylindrical section extending outwardly from the annular cap;
a clamping element coupled to an outer end of the cylindrical section of the annular cap, the clamping element having a clamping member at a first end of the clamping element that is configured to releasably hold the frame and an aperture disposed adjacent to a second end of the clamping element that is opposite the first end of the clamping element; and
a torque cartridge including a cylindrical housing arranged within the cylindrical section of the annular cap and a shaft rotatably coupled to the cylindrical housing,
wherein the shaft of the torque cartridge is coupled with the clamping element at the aperture such that the clamping element is rotatable relative to the cylindrical section of the annular cap and to the supporting bar while the cylindrical housing of the torque cartridge remains stationary relative to the cylindrical section of the annular cap and to the supporting bar, and
wherein the bracket assembly is configured to be releasably securable at an adjustable position along a length of the supporting bar when the cylindrical member is threadably coupled with the cylindrical core.

18. The bracket assembly of claim 17, wherein the shaft of the torque cartridge is coupled to the clamping element without a fastener.

19. The bracket assembly of claim 17, wherein the cylindrical housing of the torque cartridge is disposed between the supporting bar and the shaft of the torque cartridge.

20. The bracket assembly of claim 17, wherein the clamping element is removably coupled to the shaft of the torque cartridge.

\* \* \* \* \*

UNITED STATES PATENT AND TRADEMARK OFFICE
CERTIFICATE OF CORRECTION

| | | |
|---|---|---|
| PATENT NO. | : 11,852,287 B2 | |
| APPLICATION NO. | : 17/521297 | |
| DATED | : December 26, 2023 | |
| INVENTOR(S) | : Andrew Hascall McGrath | |

It is certified that error appears in the above-identified patent and that said Letters Patent is hereby corrected as shown below:

In the Claims

Column 8, Line 60, "The first bracket" should be --The bracket--.

Signed and Sealed this
Thirteenth Day of February, 2024

Katherine Kelly Vidal
*Director of the United States Patent and Trademark Office*